Patented June 29, 1926.

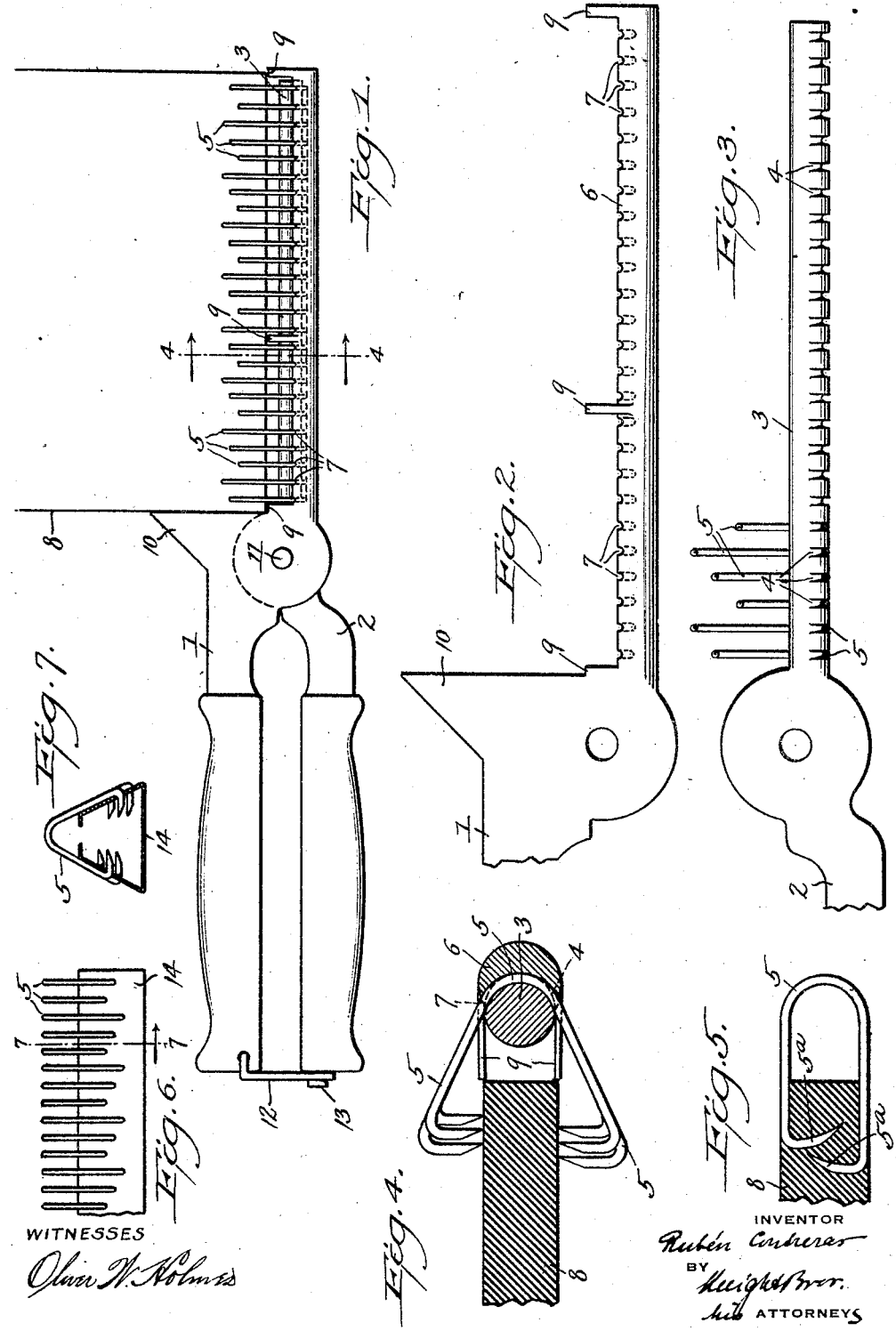

1,590,808

UNITED STATES PATENT OFFICE.

RUBÉN CONTRERAS, OF MEXICO, MEXICO.

BELT-LACING CLIPPER.

Application filed March 1, 1924. Serial No. 696,257.

My invention involves an appliance in the form of hand pliers or clippers for the purpose of attaching lacing hooks to driving belts. Lacing hooks of this type are well known in the art, being fashioned with two jaws which are forced together by a suitable tool so that the teeth of the jaws are forced into the leather or other material of which the belt is composed. Contrivances for thus attaching these lacing hooks to belts are also well known in the art. The general idea involved in the use of these contrivances is to hold all the hooks, desired to attach to the belt, in ready position after they have been inserted into the device, after which the end of the belt is inserted into the device, when suitable mechanism is operated by which the two jaws of all the hooks are closed down onto the belt.

Devices of this character, however, involve a considerable amount of mechanism and they are consequently somewhat heavy and unwieldy to handle and owing to their complicated nature are quite expensive, so that shops being equipped with only a few pieces of belt driven machinery could hardly afford the price of such a device which might only be used say once in a month. Thus such shops are deprived of the use of belt hooks which in themselves are very practical, but which cannot be reliably attached and properly spaced without a suitable device.

My invention is directed, therefore, to the simplification of the hook attaching means, and I have reduced, according to my invention, this device to the form of a pair of simple clippers which hold the lacing hooks properly spaced apart and in ready position to be driven into the belt.

Referring to the drawings:

Figure 1 represents a full view of the clippers containing lacing hooks ready to be attached to a belt;

Figures 2 and 3 respectively each show one of the two component elements of the plier or clipper;

Figure 4 shows a transverse section through the clipper on the line 4—4 in Figure 1, the section being shown in greatly enlarged scale;

Figure 5 is a section through the belt similar to that shown in Figure 4 showing a lacing hook driven into the belt; and Figures 6 and 7 respectively are a side elevation and transverse section through a cardboard strip of lacing hooks in the form in which these hooks are now sold in the market, and in which they are employed for charging the clippers with hooks.

Referring to Figures 1, 2 and 3 the clipper consists of the two component elements 1 and 2 which are individually shown respectively in Figures 2 and 3. It will be noted that element 2 has a jaw in the form of a round bar 3 which is provided at one half of its circumference with a plurality of grooves 4, spaced apart the distance which it is desired to space the lacing hooks. The hooks are indicated by circles 5 in some of the grooves. The component element 1 of the clipper consists of a bar 6, complementary in its shape with respect to bar 3 so that it will substantially half way embrace this bar. The shape of the two jaws of the clippers may best be seen in Figure 4 at 3 and 6. Jaw 6 is provided with notches 7 at the edges of the channelled portion, which are spaced apart similar distances as are grooves 4 of jaw 3 and which are located so as to register with grooves 4. Thus, when the two jaws 3 and 6 are held together they are able to hold in their grooves and notches the lacing hooks 5 in a position shown in Figure 4. As will be noted in this figure the jaws of the hooks 5 are all held so that the belt 8 can easily be inserted between the jaws.

For practical purposes it is desirable to use lacing hooks having different lengths of jaws and to use the different lengths in staggered fashion such as is shown at 5 in Figure 1. Three of such lacing hooks are shown in Figure 4 with their teeth in staggered relation to each other.

In order to bring about that the lacing hooks are attached to the belt so that their closed or loop ends are all exactly on a line at right angles to the longitudinal axis of the belt, I have provided the following means: Jaw 6 is provided with spacers 9, of which three are shown in Figure 2, against which the end of the belt abuts, as is shown in Figure 4. Furthermore, the clipper element 1 is provided with a lateral guide 10 near the point where the two clipper elements are pivotally attached to each other as at 11. When the belt 8 is inserted between the assembled lacing hooks 5 and pushed against the closed jaws of the clipper until its end abuts against the spacers 9, the clippers are adjusted against the belt such that guide 10 fits against the straight side of the belt.

The operation of attaching the lacing-hooks to the belt is very simple. The arrangement such as is shown in Figure 1, is placed on any hard surface, such for instance as against any straight surface of a piece of machinery and the hooks are then hammered into the leather. Since the lacing hooks are provided with very sharp teeth they will readily enter the leather without much effort on the part of the operator. The hooks being held firmly in position, it is very easy for the operator to drive the teeth of the hooks straight. The teeth of the hooks are shaped so that when they are driven into the leather they will slightly bend inward such as is shown at 5$^a$ in Figure 5.

In order to enable the operator to freely handle the clipper after it has been charged with lacing hooks without any danger that the clipper may accidentally open, a lock is provided by which the two handles of the clipper may be locked together after the hooks have been inserted. This lock is shown in Figure 1 in the form of a bail 12 pivoted in element 1 of the clipper, the bail fitting over a small boss 13 provided at the rear end of the component element 2 of the clipper.

In order to charge the clipper with hooks the operator merely fishes the round jaw 3 of the clipper into a row of hooks still mounted on the paper strip 14 shown in Figures 6 and 7 and then closes the jaws of the clipper whereupon he removes the paper 14 from the teeth of the hooks whereafter the clipper is ready to receive the belt.

After the hooks are attached to the belt, the clipper jaws are released and jaw 3 is slightly shifted towards the edge of the belt so that the loop ends of the lacing hooks become disengaged from grooves 4, whereupon the jaw can be withdrawn from the loops.

By providing a suitable number of spacing elements 9 such as are shown in Figure 2, the same clipper may be used for attaching lacing hooks to quite narrow belts. One of the great advantages of this clipper I find to be that it can be easily carried around in the shop, and if necessary, it can be used by the operator standing on a ladder when lacing a belt in out of the way positions, where heavy belt lacing machines of the type heretofore used would be very inconvenient, if not impossible to use.

I have found from my own practical experience that with such a clipper the lacing hooks may be hammered into the leather with the same accuracy with which the large devices heretofore used attach these hooks.

I claim:—

1. A clipper for attaching lacing hooks to belts, having a round jaw of suitable length and a channeled jaw partway surrounding the round jaw, each jaw having respectively a plurality of corresponding grooves and notches suitably spaced apart, each pair of grooves and notches adapted to hold a lacing hook in ready attachable position, and spacing elements on one of the jaws for uniformly spacing the belt end from the loop ends of the lacing hooks.

2. A clipper for attaching lacing hooks to belts, having a round jaw of suitable length and a channeled jaw partway surrounding the round jaw and pivoted thereto, each jaw having respectively a plurality of corresponding grooves and notches suitably spaced apart, each pair of grooves and notches adapted to hold a lacing hook in ready attachable position, spacing elements on one of the jaws for uniformly spacing the belt end from the loop ends of the lacing hooks, and a guide of suitable length near the pivotal end of one of the clipper jaws for directing the alinement of the lacing hooks at right angles to the longitudinal edges of the belt.

RUBÉN CONTRERAS.